US009610838B2

(12) United States Patent
Ballard et al.

(10) Patent No.: US 9,610,838 B2
(45) Date of Patent: Apr. 4, 2017

(54) FLUID RECEIVER

(71) Applicant: Flomax International, Inc., Springville, UT (US)

(72) Inventors: Mark Paul Ballard, Pleasant Grove, UT (US); Carl Paul Ballard, Lindon, UT (US); John Trent Kendrick, Mapleton, UT (US)

(73) Assignee: Flomax International, Inc., Springville, UT (US)

(*) Notice: Subject to any disclaimer, the term of this patent is extended or adjusted under 35 U.S.C. 154(b) by 61 days.

(21) Appl. No.: 14/509,970

(22) Filed: Oct. 8, 2014

(65) Prior Publication Data

US 2015/0096634 A1 Apr. 9, 2015

Related U.S. Application Data

(60) Provisional application No. 61/888,363, filed on Oct. 8, 2013.

(51) Int. Cl.
*B60K 15/04* (2006.01)
*B60K 15/03* (2006.01)

(52) U.S. Cl.
CPC ..... *B60K 15/0403* (2013.01); *B60K 2015/03296* (2013.01); *Y10T 137/88038* (2015.04)

(58) Field of Classification Search
CPC ...... B60K 15/0403; B60K 2015/03296; B60K 2015/03256; Y10T 1137/88038; Y10T 1137/88054; Y10T 1137/86928; Y10T 1137/88046; F16K 11/20; F16K 1/443; F16K 1/446

USPC .......... 137/614.18, 614.2, 628, 614.19
See application file for complete search history.

(56) References Cited

U.S. PATENT DOCUMENTS

| 2,404,924 A | * | 7/1946 | Sacchini | F16K 17/30 |
| | | | | 137/493 |
| 3,836,114 A | | 9/1974 | Norton et al. | |
| 4,953,588 A | * | 9/1990 | Sands | F16K 15/063 |
| | | | | 137/512.3 |
| 5,103,877 A | | 4/1992 | Sherwood et al. | |
| 5,255,699 A | | 10/1993 | Herzan et al. | |
| 5,310,226 A | | 5/1994 | Norkey | |
| 5,590,697 A | | 1/1997 | Benjey et al. | |
| 6,354,564 B1 | | 3/2002 | Van Scyoc et al. | |
| 6,460,899 B1 | | 10/2002 | Ose | |
| 6,869,060 B2 | | 3/2005 | Barber et al. | |

(Continued)

OTHER PUBLICATIONS

PCT/US2014/059754, International Search Report and Written Opinion, Jan. 21, 2015.

*Primary Examiner* — Michael R Reid
(74) *Attorney, Agent, or Firm* — Kunzler Law Group

(57) ABSTRACT

An apparatus and system are disclosed for a fuel receiver. The apparatus includes a base having an inlet and an outlet that defines an interior channel through which fluid is flowable. The apparatus also includes a first valve movable relative to the base between a closed position and an open position allowing fluid flow through the inlet. The apparatus also includes a second valve independently movable relative to the base and the first valve, the second valve movable between a closed position and an open position allowing fluid flow through the inlet. The system includes the apparatus, and a fluid reservoir or tank in fluid communication with the apparatus.

12 Claims, 5 Drawing Sheets

(56) References Cited

U.S. PATENT DOCUMENTS

| | | |
|---|---|---|
| 6,959,727 B2 | 11/2005 | Krishnamoorthy et al. |
| 7,621,211 B2 | 11/2009 | Ma et al. |
| 7,740,224 B2 | 6/2010 | Bill et al. |
| 8,191,575 B2 | 6/2012 | Krug, Jr. et al. |
| 2001/0011538 A1 | 8/2001 | Crary et al. |
| 2003/0131888 A1 | 7/2003 | Cortez et al. |
| 2007/0231621 A1 | 10/2007 | Rosal et al. |
| 2008/0202600 A1 | 8/2008 | Peattie et al. |
| 2010/0071805 A1 | 3/2010 | Mackey et al. |

* cited by examiner

FLUID RECEIVER

CROSS-REFERENCES TO RELATED APPLICATIONS

This application claims the benefit of and claims priority to U.S. Provisional Patent Application No. 61/888,363 entitled "FLUID RECEIVER" and filed on Oct. 8, 2013 for Mark Paul Ballard et al., which is incorporated herein by reference.

FIELD

This disclosure relates to fluid transfer devices, and more particularly to a fluid receiver for receiving fluid from a nozzle.

BACKGROUND

Fuel receivers for receiving fuel from a fuel source are used for refueling large pieces of equipment, such as construction and mining vehicles, on-site using a mobile refueling source, such as a refueling truck. Generally, the fuel receivers are secured to the equipment in fluid communication with a fuel tank of the equipment. A fuel source includes a hose and a nozzle attached to an end of the hose. When fueling or refueling of the equipment is desired, the nozzle is placed securely over the receiver, a valve of the receiver is opened, and fuel is pumped from the fuel source, through the hose, nozzle, and receiver, to the fuel tank of the equipment. Such receiver and nozzle refueling systems are designed to facilitate efficient refueling events, that is, attachment of the nozzle, transmission of fuel into the fuel tank, and detachment of the nozzle.

The fuel receiver typically includes a pressure activated valve that opens when connected with the nozzle. The valve prevents the unintended drainage of fuel through the fuel receiver. However, traditional fuel receivers have no "backflow" capabilities to prevent the theft of fuel from the fuel tank by merely depressing or actuating the valve.

SUMMARY

An apparatus for a fuel receiver assembly is disclosed. In one embodiment, the apparatus includes a base having an inlet and an outlet, the base defining an interior channel through which fluid is flowable from the inlet to the outlet, and a first valve movable relative to the base between a closed position in sealing engagement with the base to prevent fluid flow through the inlet and an open position allowing fluid flow through the inlet, the first valve comprising a plug and a stem. The apparatus also includes a second valve independently movable relative to the base and the first valve, the second valve movable between a closed position in sealing engagement with the base and an open position allowing fluid flow through the inlet, the second valve comprising an opening for engaging the stem such that the second valve slidably engages the first valve.

In one embodiment, the apparatus includes a valve guide mount disposed in the outlet, and a valve guide extending from the valve guide mount towards the inlet and comprising a closed-end channel. The stem, in one embodiment, comprises a closed-end channel configured for receiving the valve guide. The apparatus may also include a first spring disposed in a cavity formed by the stem and the valve guide, where the first spring configured to bias the first valve with reference to the valve guide.

In one embodiment, the apparatus includes a second spring disposed between the second valve and the valve guide mount. The second spring may be configured to bias the second valve with reference to the valve guide mount. The second spring, in one embodiment, biases the second valve to move the second valve to the closed position and form a seal with the base.

In one example, the second valve comprises a collar that extends from the second valve towards the valve guide support and has a diameter greater than the second spring. In one embodiment, the combined spring strength of the first spring and the second spring is less than a pressure of the fluid flow through the base, and the second spring has a greater diameter than the first spring. In one embodiment, where the internal channel comprises a first portion having a first diameter larger than a diameter of the first valve, and a second portion have a second diameter larger than a diameter of the second valve, such that fluid may flow past the first valve and the second valve when both the first valve and the second valve are in the open position. In one embodiment, the base further comprises threads formed on an external surface of the base and configured to engage an opening of a fluid tank.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

The subject matter of the present application has been developed in response to the present state of the art, and in particular, in response to the problems and needs in the art that have not yet been fully solved by currently available fuel receivers. Accordingly, the subject matter of the present application has been developed to provide a fluid receiver that overcomes at least some shortcomings of the prior art.

Figure 1:
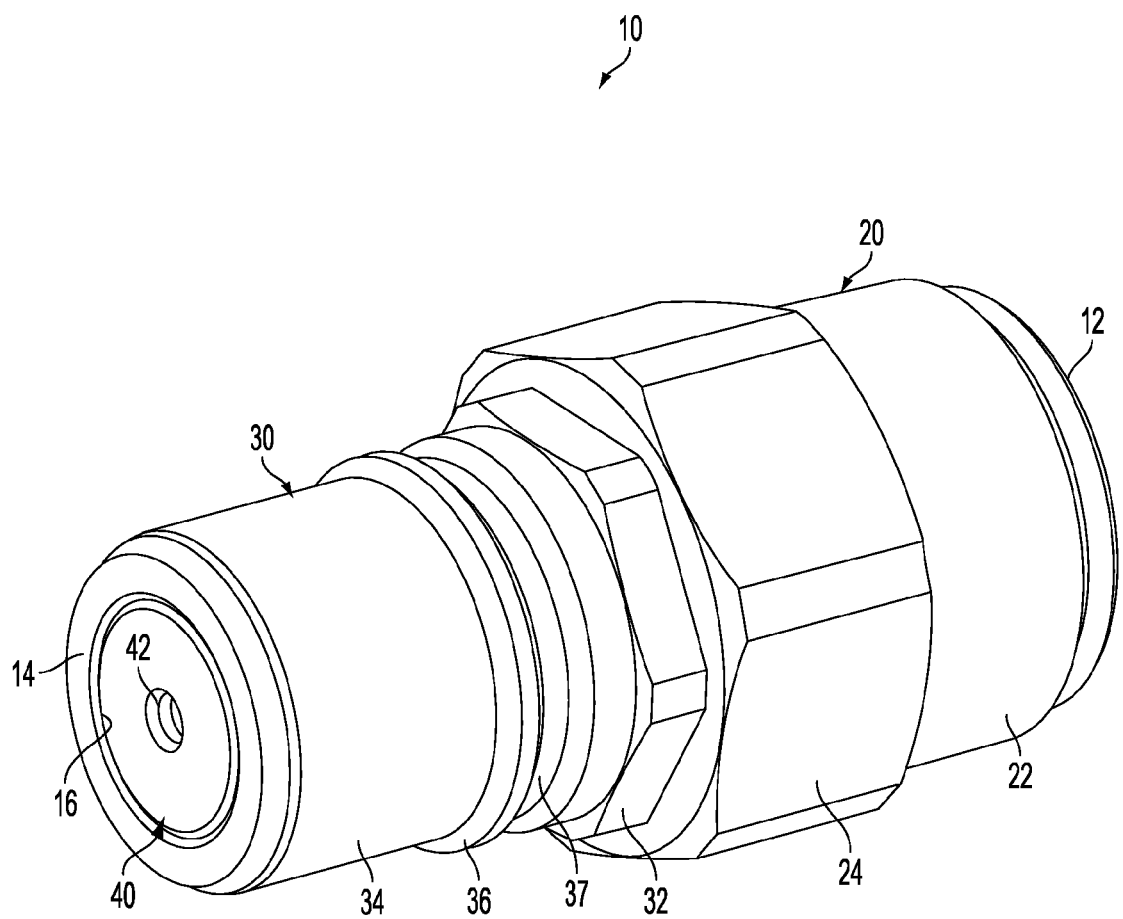
FIG. 1 is an anterior perspective view of a fluid receiver according to one representative embodiment.

Referring to FIG. 1, and according to one illustrative embodiment, a fuel receiver 10 includes a base 20 and a removable sleeve 30 removably coupleable to the base. In another embodiment, and as will be described below, the receiver 10 may be formed as a single unit, or in other words, the sleeve 30 is formed as part of the base 20. The fuel receiver 10 extends from a first inner end 12 to a second outer end 14. Generally, the fuel receiver 10 is secured to a tank 59 motorized vehicle (see FIG. 3) such that the first inner end 12 is in fluid communication with a fuel tank (not shown) and the second outer end 14 extends away from the vehicle to be accessible at a location external to the vehicle. The fuel receiver 10 also includes a fuel inlet 16 proximate the second outer end 14 and a fuel outlet 18 proximate the first inner end 12 (see FIG. 2). In another embodiment, a hose may fluidly couple the fluid receiver with the tank 59.

Figure 2:
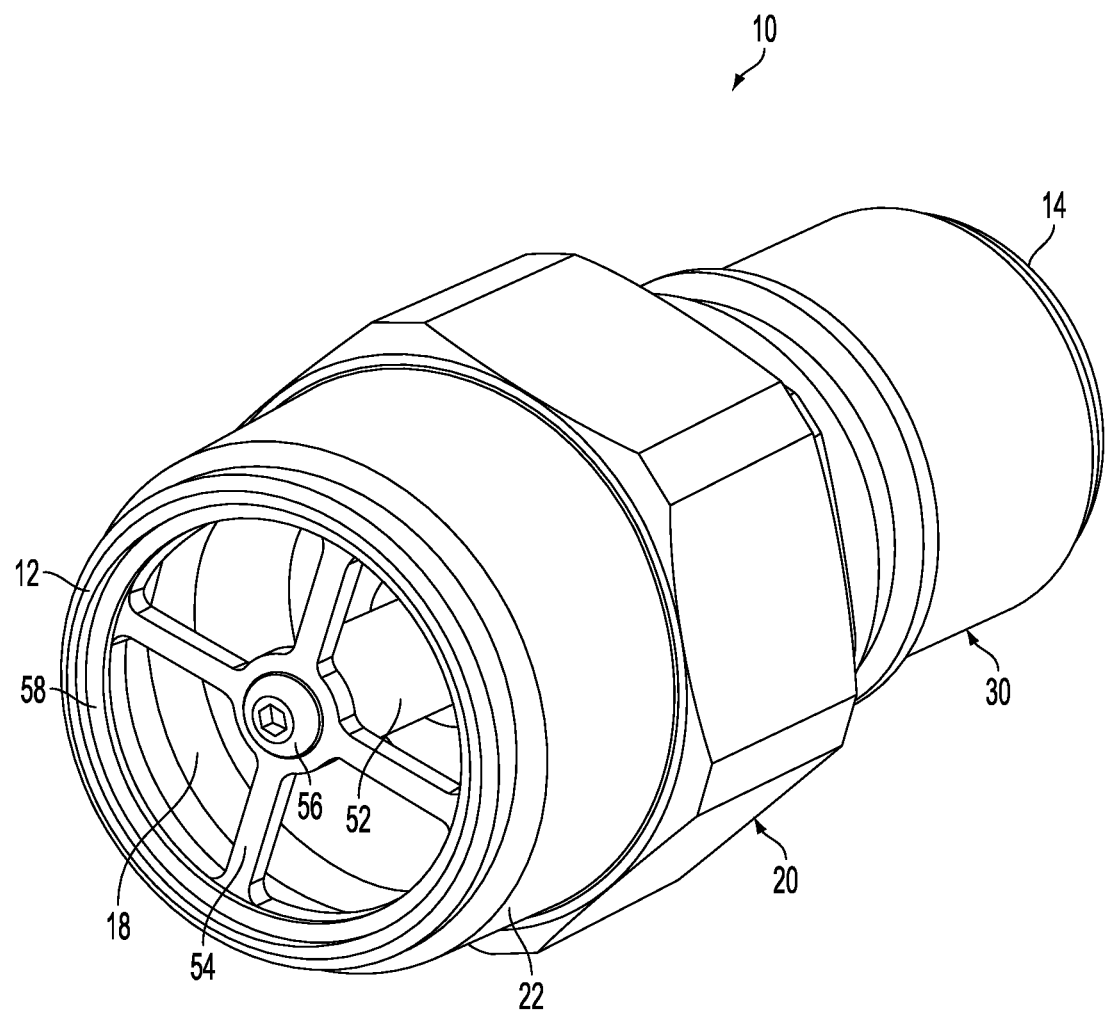
FIG. 2 is a posterior perspective view of the fluid receiver of FIG. 1.
Figure 3:
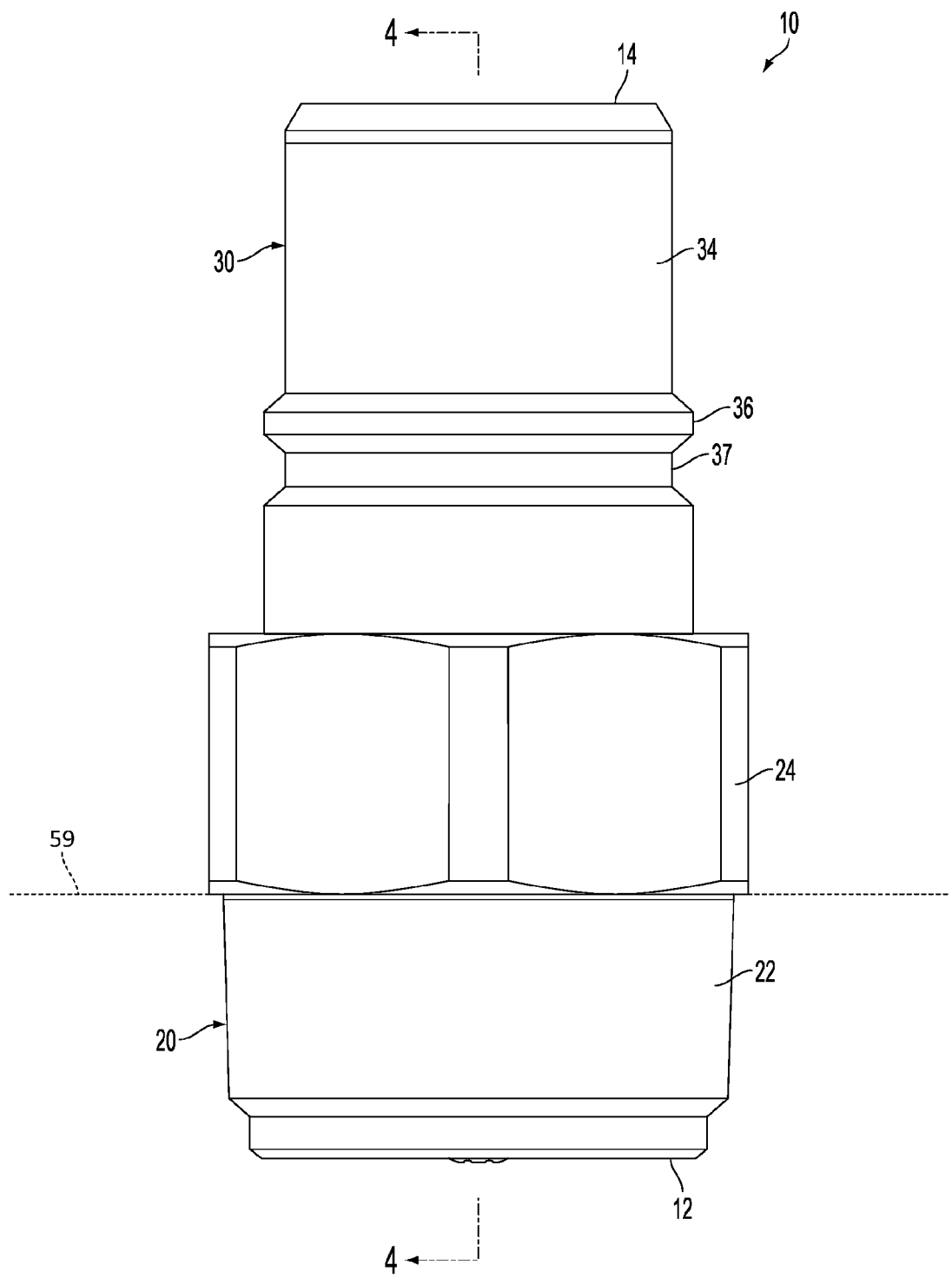
FIG. 3 is a side elevation view of the fluid receiver of FIG. 1.

Referring now jointly to FIGS. 1-3, the base 20 includes a vehicle attachment portion 22 and a head portion 24. Although not shown, the vehicle attachment portion 22 includes external threads configured to mate with internal threads formed in the tank 59 of a vehicle. Although the head portion 24 is shown as having a generally hexagonal shape for receiving commonly available tools, such as wrenches or hexagonally-shaped sockets, the head portion 24 can have any of various shapes for receiving any of various tightening and loosing tools. The base 20 is secured to the tank 59 by threadably engaging the external threads of the vehicle attachment portion 22 with the internal threads of the vehicle and tightening the head portion 24 against the vehicle by rotating the base relative to the vehicle using a tool in mating engagement with the head portion 24.

The fuel receiver 10 includes a valve, e.g., poppet 40 (see FIG. 1), movably coupled to the base 20. The poppet 40 includes a nozzle guide 42 for receiving a portion of an actuating device, e.g., an opposing poppet, of a nozzle and maintaining proper alignment between the poppet 40 and the actuating device of the nozzle. The poppet 40 is coupled to the base 20 via a valve guide 52, a spring 60, and engagement between a stop 80 on the poppet and the inwardly facing surface defining the diverging section 86 of the interior channel 29, as will be discussed below with reference to FIGS. 4-5.

In one embodiment, the removable sleeve 30 includes a head portion 32 and a nozzle guide portion 34. Like the head portion 24, the head portion 32 is shown having a generally hexagonal shape for receiving commonly available tools, such as wrenches or hexagonally-shaped sockets. However, in other embodiments, the head portion 32 can have any of various shapes for receiving any of various tightening and loosing tools. The nozzle guide portion 34 is configured to initially receive and properly align the nozzle of a fueling hose. In yet other embodiments, the nozzle guide portion 34 is rigidly attached to the base, and a hexagonal head portion 24 for removal of the sleeve is replaced with a fixed or unitary joint between the nozzle guide portion and the base 20.

The receiver 10 also includes an annular ridge 36 extending about a circumference of the sleeve and positioned between the head portion 32 and nozzle guide portion 34. The annular ridge 36 and annular groove 37 are configured to mate with corresponding elements of a nozzle. More specifically, the annular ridge 36 mates with a sealing element, e.g., a wiper seal, of the nozzle to create a seal between the wiper seal and the annular ridge 36. The annular groove 37 mates with a ring of ball bearings of the nozzle to securely couple the nozzle to the receiver 10. As shown, the annular ridge 36 and annular groove 37 are tapered to facilitate the sliding of the ball bearings up over the annular ridge and into the annular groove 37.

As shown in FIG. 2, a valve guide 52 is a generally tubular shaped element extending substantially perpendicularly from the outlet 18 toward the inlet 16. The valve guide 52 defines a channel 82 for receiving a spring 60 (see FIG. 4) that extends from a free end 92 of the valve guide 52 to a location proximate a fixed end 94. The valve guide 52 is held in place by a valve guide support 54 secured to the base 20 and a fastener 56. The fastener 56 extends through the valve guide support 54 and threadably engages, in one embodiment, an internally threaded aperture 96 of the valve guide 52. The valve guide support 54 is secured to the base 20 by a snap ring 58 engaged with a channel 97 formed in the base 20. In this manner, the valve guide 52 is fixed relative to the base 20 and axially aligned with a central axis 62 of the receiver 10.

The various components of the fuel receiver 10 described above with reference to FIGS. 1-3, are made of a rigid and durable material. For example, in one implementation, the base 20 and poppet 40 are made of aluminum and the removable sleeve 30, spring 60, and valve guide 52 are made of steel. Generally, the exterior surface of the receiver in contact with the nozzle and associated attachment mechanisms of the nozzle must be a durable material, such as steel, to withstand continuous attachment and detachment of the nozzle. With conventional receivers, the portion of the receiver in contact with the nozzle is the nose portion of the base. Therefore, either the entire base or the entire nose portion of conventional receivers must be made of a harder and more durable material, such as steel. However, the base 20 of the fuel receiver 10 can be made of a less expensive and less durable material, such as aluminum, because the base 20 is not in contact with the nozzle.

Figure 4:
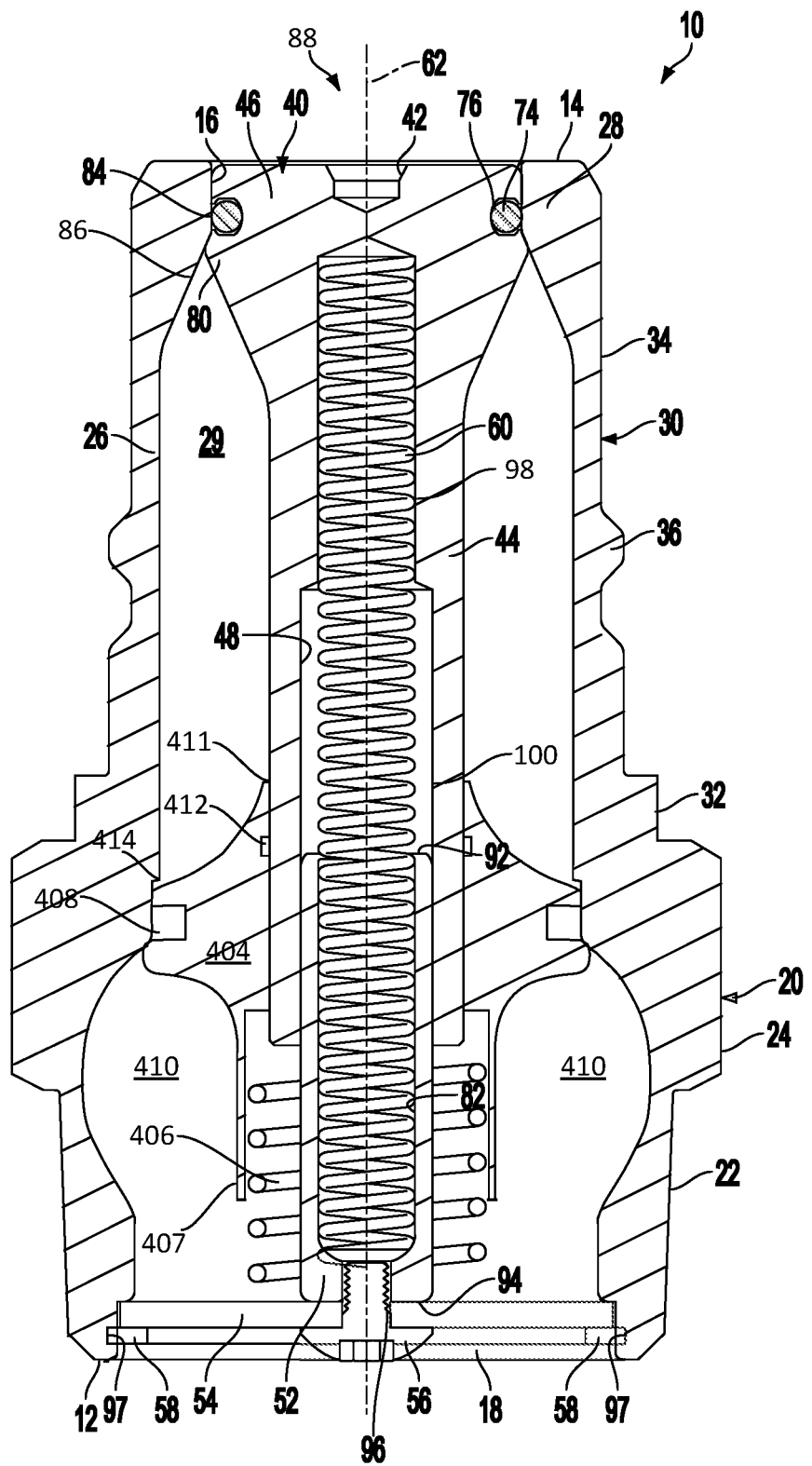
FIG. 4 is a side cross-sectional view of the fluid receiver of FIG. 1 taken along the line 4-4 of FIG. 3 shown in a closed position.

FIG. 4 is a side cross-sectional view of the receiver 10 of FIG. 1 taken along the line 4-4 of FIG. 3 shown in a closed position. The phrase "closed position" refers to a position of the poppet 40 such that no fluid is able to pass through the receiver 10. The poppet 40, in the closed position, engages the end 16 and forms a seal through which no fluid passes.

In the depicted embodiment, the base 20 includes a nose portion 26 extending from the head portion 24 to an outer end portion 28. The outer end portion 28 defines an interior channel 29 through which fluid may flow when the poppet 40 is in an "open position." The poppet 40 is configured with an annular channel disposed near the end which is configured to engage a first O-ring 70.

An inwardly facing surface of the base 20 defines the interior channel 29 through which fuel flows during a refueling event. The interior channel 29 extends from the outlet 18 to the base inlet 88. Extending from the base inlet 88 toward the outlet 18, the interior channel 29 includes a first straight section 84 and a diverging section 86 extending from the first straight section 84 that has a first diameter approximately equal to a diameter of the base inlet 88. Adjacent the first straight section 84 is a diverging section 86 that has an increasing diameter in a direction away from the straight section 84 toward the outlet 18.

The interior channel 29 continues with a second straight portion until encountering a second valve or poppet 404. The second poppet 404 is configured with an opening 411 having a diameter selected to slidably engage the first poppet 40. The first poppet 40 slides independently from the second poppet 404 on the valve guide 52. In other words, the first poppet 40 and the second poppet 404, in one embodiment, are not mechanically coupled such that the movement of one affects the other. Accordingly, the second poppet 404 functions as a one-way valve, or anti-theft device to prevent the theft of fluid, such as diesel fuel. Stated differently, even if the first poppet 40 is actuated from the base inlet 88 by some type of device, the second poppet 404 will not allow fluid to pass from the storage tank to the inlet 88 of the receiver. The second poppet 404, however, will actuate in the other direction with minimal force. That is to say, that the second poppet 404 will slide towards the outlet 18 when a force (i.e., a fluid being supplied with a sufficient pressure) compresses a spring 406.

Both the first poppet 40 and the second poppet 404 may be biased with a spring. The first poppet 40 is biased with spring 60 that extends from the valve guide 52 towards the inlet 88 in a closed-end channel 48 formed in the stem 44 of the first poppet 40. The closed-end channel of the stem, together with the closed-end channel of the valve guide, form a cavity in which the first spring may be disposed. A second spring 406 is selected to have a diameter greater than the first poppet 40 so that the first poppet 40 may slide towards the outlet 18 without being impeded by the second spring 406.

The first poppet 40 includes a stem 44 extending away from a plug 46. The stem 44 defines an interior channel 48. In the illustrated embodiment, the interior channel 48 includes an outer portion 98 having a diameter just larger than an outer diameter of the spring 60 and an inner portion 100 having a diameter just larger than an outer diameter of the valve guide 52. In this manner, the outer portion 98 of the interior channel 48 is configured to matingly receive the first spring 60 and the inner portion 100 is configured to matingly receive the valve guide 52. In the illustrated embodiment, the outer diameter of the stem 44 remains substantially constant along the length of the stem.

The plug 46 is positionable proximate the base inlet 88 to seal the inlet 88 for preventing fuel and contaminants from entering the receiver and fuel tank, and preventing fuel from exiting the fuel tank through the receiver. To seal the base inlet 88 of the receiver 10, the plug 46 includes the stop 80 and an O-ring 74. The stop 80 is a generally annularly-shaped ridge having an outer diameter greater than the diameter of the first straight section 84. Because the diameter of the stop 80 is greater than that of the first straight section 84, the plug 46, and thus the poppet 40, is prevented from traveling outwardly through the base inlet 88. More specifically, as discussed above, as the plug 46 moves outwardly from an open position of the receiver 10 (see, e.g., FIG. 5) toward a closed position of the receiver 10 (see, e.g., FIG. 4), the stop 80 contacts the second diverging section 86 of the interior channel 29 and prevents further outward movement.

The O-ring 74 is seated within a channel 76 formed in the plug 46. As the plug 46 moves outwardly from the open position toward the closed position, the O-ring 74 contacts and forms a seal with the first straight section 84 of the interior channel. The seal between the O-ring 74 and the first straight section 84 also prevents fuel from passing between the plug 46 and the nose portion 26 of the base 20. As defined herein, the receiver 10 is in the closed position when the stop 80 is in contact with the surface defining the diverging section 86 and the O-ring 74 is sealingly engaged with the straight section 84. Conversely, the receiver 10 is in the open position when the stop 80 is out of contact with the diverging section 86, the O-ring 74 is out of sealed engagement with the straight section 84, and a space between the plug and nose portion 26 is defined to facilitate fuel flow into the interior channel 29.

When assembled, the first spring 60 is positioned within the interior channel 48 of the stem 44 and the interior channel 82 of the valve guide 52. The valve guide 52 maintains axial alignment of the poppet 40 with the base during actuation of the first poppet 40. The bias of the first spring 60 urges the poppet 40 in an outward direction, i.e., a direction extending from the outlet 18 to the inlet 16, to place the receiver in the closed position. The first spring 60 has a predetermined bias corresponding to a desired amount of backpressure generated by the receiver 10. Generally, the lower the bias the lower the backpressure and vice versa.

The second poppet 404, like the first poppet 40, is configured with an O-ring 408 for sealing an exterior surface of the second poppet 404 to the interior channel 29. The interior channel 29 is formed with a bulge region 410. The bulge region 410 forms an opening into which the second poppet 404 may move to allow the fluid to pass from the inlet 88 to the outlet 18. The second poppet 404 may also be formed with an annular channel in the opening to matingly engage an O-ring 412. The O-ring 412 forms a seal between the second poppet 404 and the first poppet 40. The second poppet 404 is also configured with a collar 407 (or sleeve) that extends toward the valve guide support, and has a diameter greater than the second spring.

The diameter of the opening of the second poppet 404 is selected to engage the stem of the first poppet 40 such that the first poppet 40 maintains the axial alignment of the second poppet 404. The second spring 406 has a predetermined bias corresponding to a desired amount of backpressure generated by the receiver. The amount of bias, or spring force or strength, of the first and second springs is selected to be less than a predetermined pressure of a pump that is pushing the fluid through the receiver.

The second poppet 404, when in the closed position, engages a step 414 formed in the inner surface of the receiver. The step 414, in one embodiment, forms a stop point for the second poppet 404. Stated differently, the step 414 has a diameter less than the second poppet 404 such that the second poppet 404 does not advance closer to the inlet 88 than the step 414.

Figure 5:
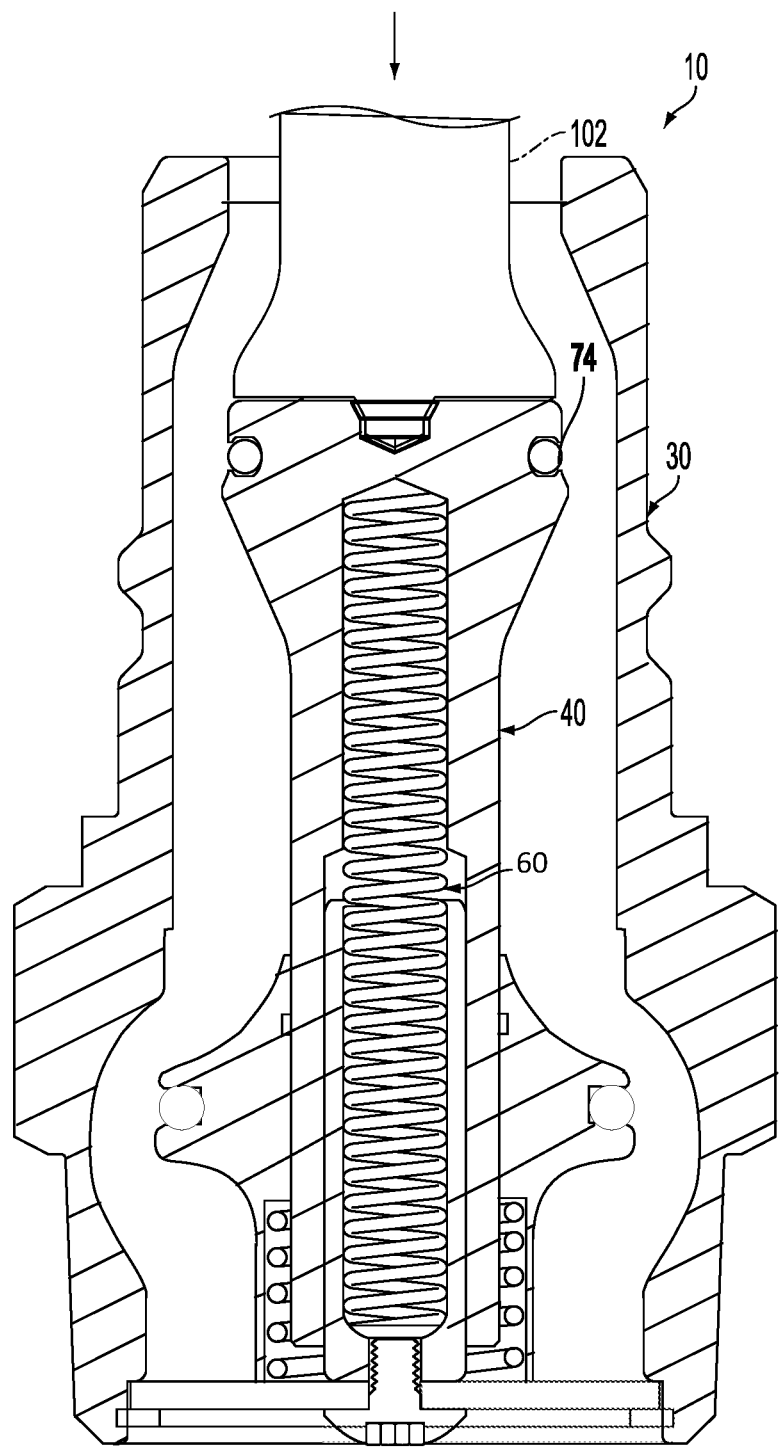
FIG. 5 is a side cross-sectional view of the fluid receiver of FIG. 1 taken along the line 4-4 of FIG. 3 shown in an open position.

FIG. 5 is a side cross-sectional view of the receiver 10 of FIG. 1 taken along the line 4-4 of FIG. 3 shown in an open position. During the refueling process, an opposing poppet or plunger 102 of a fueling nozzle contacts the poppet 40 and applies an inwardly directed force (i.e., a force directed in a direction opposite outward direction) onto the poppet 40. When the force generated by the poppet 102 is greater than the biasing force of the first spring 60, the poppet 40 moves inwardly such that the seal between the O-ring 74 and nose portion is broken and fuel is allowed to flow through the base inlet between the poppet 40 and the nose portion. The pressure of the fuel displaces the second poppet 404 and opens the interior channel such that the fuel can flow from the inlet to the outlet. When the pressure of the fuel is no longer sufficient to overcome the bias of the second spring of the second poppet 404, the pressure of the fuel in the tank together with the bias of the second spring causes the second poppet 404 to slide towards the inlet and seal against the step 414. Fuel from the tank, accordingly, cannot escape through the receiver 10.

Although the illustrated embodiment has been described as being a fuel receiver, in other embodiments, the receiver 10 can be used to facilitate the secure transfer of any of various types of fluids from one location to another location.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for receiving a fluid from a fluid source, comprising:
    a base having an inlet and an outlet, the base defining an interior channel through which fluid is flowable from the inlet to the outlet;
    a first valve movable relative to the base between a closed position in sealing engagement with the inlet of the base to prevent fluid flow through the inlet and an open position allowing fluid flow through the inlet, the first valve comprising a plug and a stem, where the stem comprises a first closed-end channel configured for receiving a valve guide; and
    a second valve independently movable relative to the base and the first valve, the second valve movable between a closed position in sealing engagement with the base and an open position allowing fluid flow through the inlet, the second valve comprising an opening for engaging the stem such that the second valve slidably engages the first valve;
    a valve guide mount disposed in the outlet;
    the valve guide extending from the valve guide mount towards the inlet and comprising a second closed-end channel; and
    a first spring disposed in a cavity formed by the stem and the valve guide, the first spring configured to bias the first valve relative to the valve guide.

2. The apparatus of claim 1, further comprising a second spring disposed between the second valve and the valve guide mount, the second spring configured to bias the second valve relative to the valve guide mount.

3. The apparatus of claim 2, where the second spring biases the second valve to move the second valve to the closed position and form a seal with the base.

4. The apparatus of claim 2, where the second valve comprises a collar that extends from the second valve towards the valve guide mount and has a diameter greater than the second spring.

5. The apparatus of claim 2, where a combined spring strength of the first spring and the second spring is less than a pressure of the fluid flow through the base.

6. The apparatus of claim 2, where the second spring has a greater diameter than the first spring.

7. The apparatus of claim 1, where the interior channel comprises a first portion having a first diameter larger than a diameter of the first valve, and a second portion having a second diameter larger than a diameter of the second valve, such that fluid flows past the first valve and the second valve when both the first valve and the second valve are in the open position.

8. A fluid receiver comprising:
    an inlet and an outlet, the fluid receiver defining an interior channel through which fluid is flowable from the inlet to the outlet;
    a first valve movable relative to the fluid receiver between a closed position in sealing engagement with the inlet of the fluid receiver to prevent fluid flow through the inlet and an open position allowing fluid flow through the inlet, the first valve comprising a plug and a stem, where the stem comprises a first closed-end channel configured for receiving a valve guide; and
    a second valve independently movable relative to the fluid receiver and the first valve, the second valve movable between a closed position in sealing engagement with the fluid receiver and an open position allowing fluid flow through the inlet, the second valve comprising an opening for engaging the stem such that the second valve slidably engages the first valve;
    a valve guide mount disposed in the outlet;
    the valve guide extending from the valve guide mount towards the inlet and comprising a second closed-end channel; and a first spring disposed in a cavity formed by the stem and the valve guide, the first spring configured to bias the first valve relative to the valve guide.

9. The fluid receiver of claim 8, further comprising a second spring disposed between the second valve and the valve guide mount, the second spring configured to bias the second valve relative to the valve guide mount.

10. The fluid receiver of claim 9, where the second spring biases the second valve to move the second valve to the closed position and form a seal with the base.

11. The fluid receiver of claim 9, where the second valve comprises a collar that extends from the second valve towards the valve guide mount and has a diameter greater than the second spring.

12. The fluid receiver of claim 9, where a combined spring strength of the first spring and the second spring is less than a pressure of the fluid flow through the base.

* * * * *